(12) United States Patent
Doki et al.

(10) Patent No.: US 12,292,393 B2
(45) Date of Patent: May 6, 2025

(54) X-RAY PHASE IMAGING APPARATUS

(71) Applicant: Shimadzu Corporation, Kyoto (JP)

(72) Inventors: Takahiro Doki, Kyoto (JP); Kenji Kimura, Kyoto (JP); Taro Shirai, Kyoto (JP); Naoki Morimoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 112 days.

(21) Appl. No.: 18/249,870

(22) PCT Filed: Jul. 7, 2021

(86) PCT No.: PCT/JP2021/025645
§ 371 (c)(1),
(2) Date: Apr. 20, 2023

(87) PCT Pub. No.: WO2022/113416
PCT Pub. Date: Jun. 2, 2022

(65) Prior Publication Data
US 2023/0384244 A1 Nov. 30, 2023

(30) Foreign Application Priority Data
Nov. 25, 2020 (JP) ................................ 2020-195184

(51) Int. Cl.
*G01N 23/041* (2018.01)
(52) U.S. Cl.
CPC ..... *G01N 23/041* (2018.02); *G01N 2223/401* (2013.01)
(58) Field of Classification Search
CPC ........... G01N 23/041; G01N 2223/401; G01N 23/046
See application file for complete search history.

(56) References Cited

U.S. PATENT DOCUMENTS

| 9,528,938 | B2 * | 12/2016 | Wang ................. G01N 21/6458 |
| 2019/0072502 | A1 | 3/2019 | Sano et al. |
| 2019/0261935 | A1 | 8/2019 | Kitamura |
| 2019/0331616 | A1 * | 10/2019 | Schaff .................. G01N 23/041 |
| 2022/0091055 | A1 * | 3/2022 | Nam ........................ G01N 1/36 |

FOREIGN PATENT DOCUMENTS

| JP | 2012016370 A | 1/2012 |
| JP | 2019045394 A | 3/2019 |
| JP | 2019144177 A | 8/2019 |
| WO | 2009104560 A1 | 5/2009 |

OTHER PUBLICATIONS

Written Opinion mailed on Sep. 21, 2021, In corresponding International Application No. PCT/JP2021/025645, 7 pages.
Franz Pfeiffer et al., "Phase retrieval and differential phase-contrast imaging with low-brilliance X-ray sources," Nature Physics, Apr. 2006, vol. 2, pp. 258-261.

* cited by examiner

*Primary Examiner* — David P Porta
*Assistant Examiner* — Mamadou Faye
(74) *Attorney, Agent, or Firm* — Maier & Maier, PLLC

(57) ABSTRACT

An X-ray phase imaging apparatus includes an X-ray source; an X-ray detector; a plurality of gratings; a subject holder arranged in an X-ray irradiation area and configured to hold the subject; and an image processor configured to generate an X-ray phase contrast image based on an intensity distribution of the X-rays detected by the X-ray detector. The subject holder is formed of a first material having an X-ray transmittance greater than metal and a scattering degree smaller than the metal.

11 Claims, 9 Drawing Sheets

FIG.7
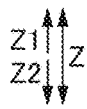
(A) SUBJECT STAGE  (B) FIRST PULLEY  (C) ROLLER GUIDE
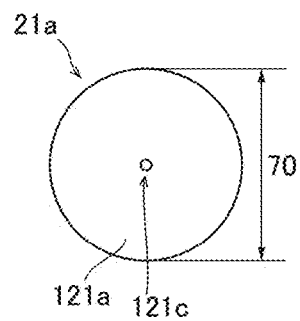 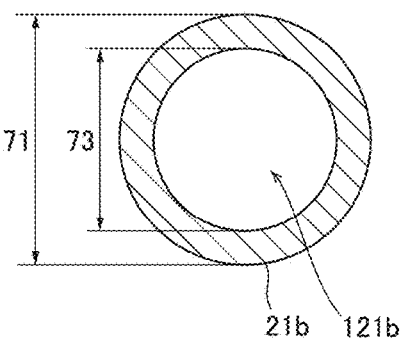 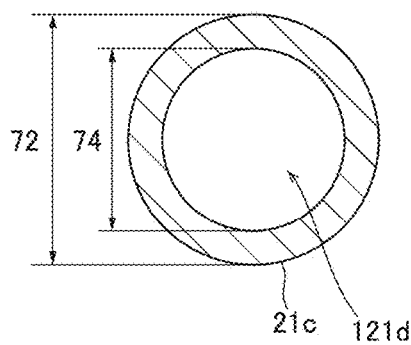
FIG.8
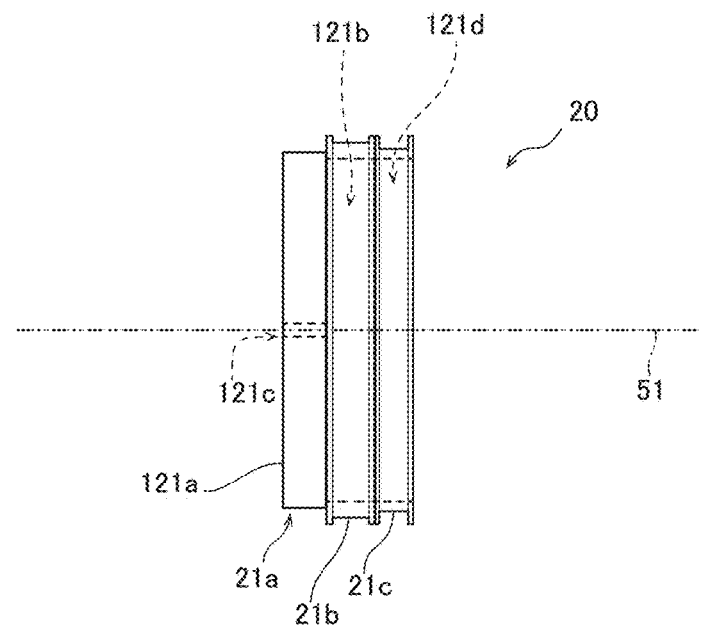

| No. | MATERIAL | TRANSMISSION LENGTH | SCATTERING | TRANSMITTANCE |
|---|---|---|---|---|
| 1 | PEEK | 30mm | 98% | 31% |
| 2 | ABS | 30mm | 98% | 39% |
| 3 | PET | 30mm | 98% | 28% |
| 4 | PVC | 30mm | 50% | 2% |
| 5 | ACRYLIC | 30mm | 96% | 31% |
| 6 | DURACON | 30mm | 90% | 24% |
| 7 | NYLON | 30mm | 93% | 35% |
| 8 | TEFLON | 40mm | 54% | 5% |
| 9 | PE | 50mm | 94% | 26% |
| 10 | PC | 30mm | 95% | 45% |

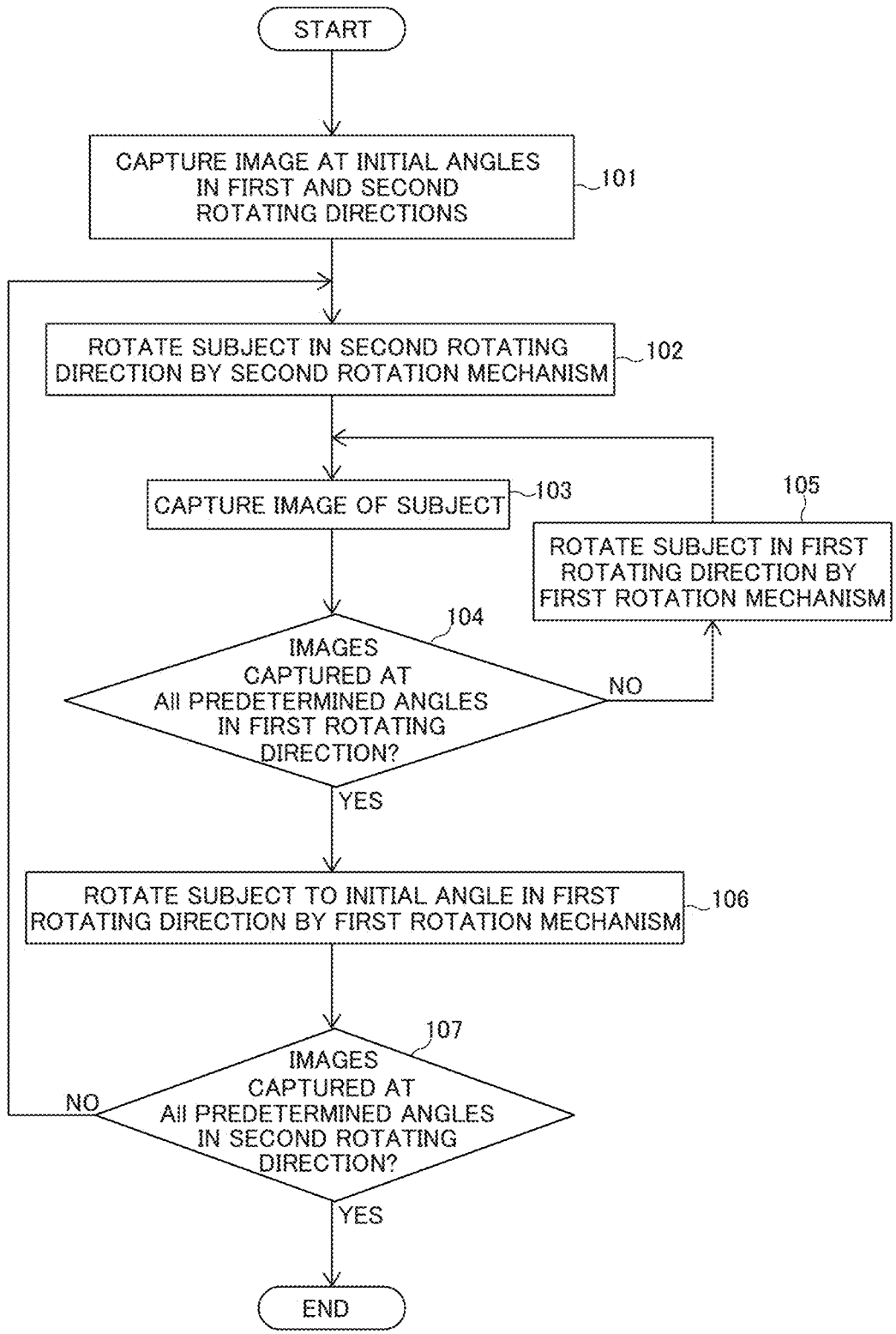
FIG.12  IMAGE CAPTURE PROCESS

X-RAY PHASE IMAGING APPARATUS

TECHNICAL FIELD

The present invention relates to an X-ray phase imaging apparatus, particularly to an X-ray phase imaging apparatus that captures an image of a subject while rotating the subject.

BACKGROUND

Conventionally, an X-ray imaging apparatus that captures images of a subject while rotating the subject is known. Such an X-ray phase imaging apparatus is disclosed in Japanese Patent Laid-Open Publication No. JP 2019-45394, for example.

JP 2019-45394 discloses an X-ray imaging apparatus including an X-ray source, an X-ray detector, a plurality of gratings arranged between the X-ray source and the X-ray detector, a rotation mechanism, and a direction-changing mechanism. The rotation mechanism is configured to rotate a subject about an axis that extends orthogonal to an X-ray irradiation axis. The direction changing mechanism is configured to rotate the subject about a rotation axis that becomes collinear with the X-ray irradiation axis when the direction changing mechanism faces the X-ray source. In addition, in the configuration disclosed in JP 2019-45394, the direction changing mechanism is arranged on the rotation mechanism. Accordingly, the X-ray phase imaging apparatus disclosed in JP 2019-45394 is configured to rotate the subject about the aforementioned rotation axis by means of the direction changing mechanism, and to capture images while rotating the direction changing mechanism by means of the rotation mechanism. Furthermore, in JP 2019-45394, an image of a carbon fiber reinforced plastic (CFRP) is captured as the subject.

CFRP is formed of a resin basic material and carbon fibers. When an image of CFRP is captured, X-rays are scattered in various directions depending on the orientation of carbon fibers arranged there. When the X-ray imaging apparatus disclosed in JP 2019-45394 captures images of a subject such as CFRP, which scatters X-rays in various directions, an image of the internal structure of the subject can be formed by detecting X-rays scattered by carbon fibers, which are aligned in directions in which the grating pattern of the grating extends. For this reason, in order to precisely form an image of the carbon fibers, which are aligned in various directions, in the subject, images are captured while the subject is rotated with respect to the grating.

JP 2019-45394 discloses the configuration in which so-called CT (Computed Tomography) imaging is performed while rotating a subject by means of the rotation mechanism together with the direction changing mechanism. When images of a subject are captured while the subject is rotated by the rotation mechanism, if the direction changing mechanism is seen on any image, an artifact will appear due to X-rays scattered by the direction changing mechanism occurs so that the quality of the captured image is reduced. To address this, the direction changing mechanism disclosed in JP 2019-45394 has the configuration that rotates the subject along a circumferential direction of a frame having an arc shape as a quarter circle (90 degrees) by means of a driver so as to prevent the direction changing mechanism from being seen on the image when the subject is rotated by the rotation mechanism together with the direction changing mechanism.

PATENT DOCUMENT

Patent Document 1: Japanese Patent Laid-Open Publication No. JP 2019-45394

SUMMARY

Since a subject holder, the rotation mechanism, or the direction changing mechanism disclosed in JP 2019-45394 is formed of a metal, if these members are located in an X-ray irradiation area, an artifact will appear due to X-rays scattered by these members, and causes a problem in which the quality of the captured image is reduced. For example, in the configuration disclosed in JP 2019-45394, since a subject is rotated along the frame having an arc shape of a quarter circle in order to prevent the direction changing mechanism from being seen on the image, the subject can be rotated by 90 degrees at the most. In a case in which the angular range available to rotate a subject by means of the direction changing mechanism is small, the subject cannot be orientated so as to direct carbon fibers in the subject in a direction in which the carbon fibers can be detected by the grating. In this case, it will be difficult to precisely form an image of the internal structure of the subject. If the shape of the frame of the direction changing mechanism disclosed in JP 2019-45394 is formed in an arc shape of a ½ circle, for example, the angular range available to rotate the subject can be increased. However, if the shape of the frame of the direction changing mechanism disclosed in JP 2019-45394 is formed in an arc shape of a ½ circle, the frame of the direction changing mechanism will be seen on the image when the subject is rotated about an axis orthogonal to the X-ray irradiation axis by the rotation mechanism. In this case, artifact will appear due to the frame of the direction changing mechanism. For this reason, the configuration capable of reducing appearance of artifacts while increasing the angular range available to rotate a subject is required.

The present invention is intended to solve the above problems, and one object of the present invention is to provide an X-ray phase imaging apparatus capable of reducing appearance of artifacts due to a subject holder located in an X-radiation range.

In order to attain the aforementioned object, an X-ray phase imaging apparatus according to an aspect of the present invention includes an X-ray source configured to irradiate a subject with X-rays, an X-ray detector configured to detect the X-rays radiated from the X-ray source, a plurality of gratings arranged between the X-ray source and the X-ray detector, and including a first grating to be irradiated with X-rays by the X-ray source and a second grating to be irradiated with the X-rays from the first grating, a subject holder arranged in an X-ray irradiation area and configured to hold the subject, and an image processor configured to generate an X-ray phase contrast image based on an intensity distribution of the X-rays detected by the X-ray detector, wherein the subject holder is formed of a first material having an X-ray transmittance greater than metal and an X-ray scattering degree smaller than the metal.

In the X-ray phase imaging apparatus according to this aspect of the present invention, as described above, the subject holder configured to hold a subject is formed of a first material having an X-ray transmittance greater than metal and an X-ray scattering degree smaller than the metal. Accordingly, even though the subject holder is arranged in an X-ray irradiation area, it is possible to reduce appearance of artifacts as compared with the configuration in which the subject holder is formed of a metal material.

BRIEF DESCRIPTION OF THE DRAWINGS

FIGS. 7(A) is a schematic views for explaining the configuration of a subject stage according to one embodiment, respectively.

FIGS. 7(B) is a schematic view for explaining the configuration of a first pulley according to one embodiment.

FIGS. 7(C) is a schematic view for explaining the configuration of a roller guide according to one embodiment.

FIG. 8 is a schematic view of the subject stage, the first pulley and the roller guide as viewed from the Y1 direction side.

FIG. 12 is a flowchart for explaining processing in which images of a subject are captured by a controller according to one embodiment.

DETAILED DESCRIPTION

Embodiment embodying the present invention is hereinafter described on the basis of the drawings.

The overall configuration of an X-ray phase imaging apparatus 100 according to one embodiment of the present invention is now described with reference to FIG. 1.

Figure 1:
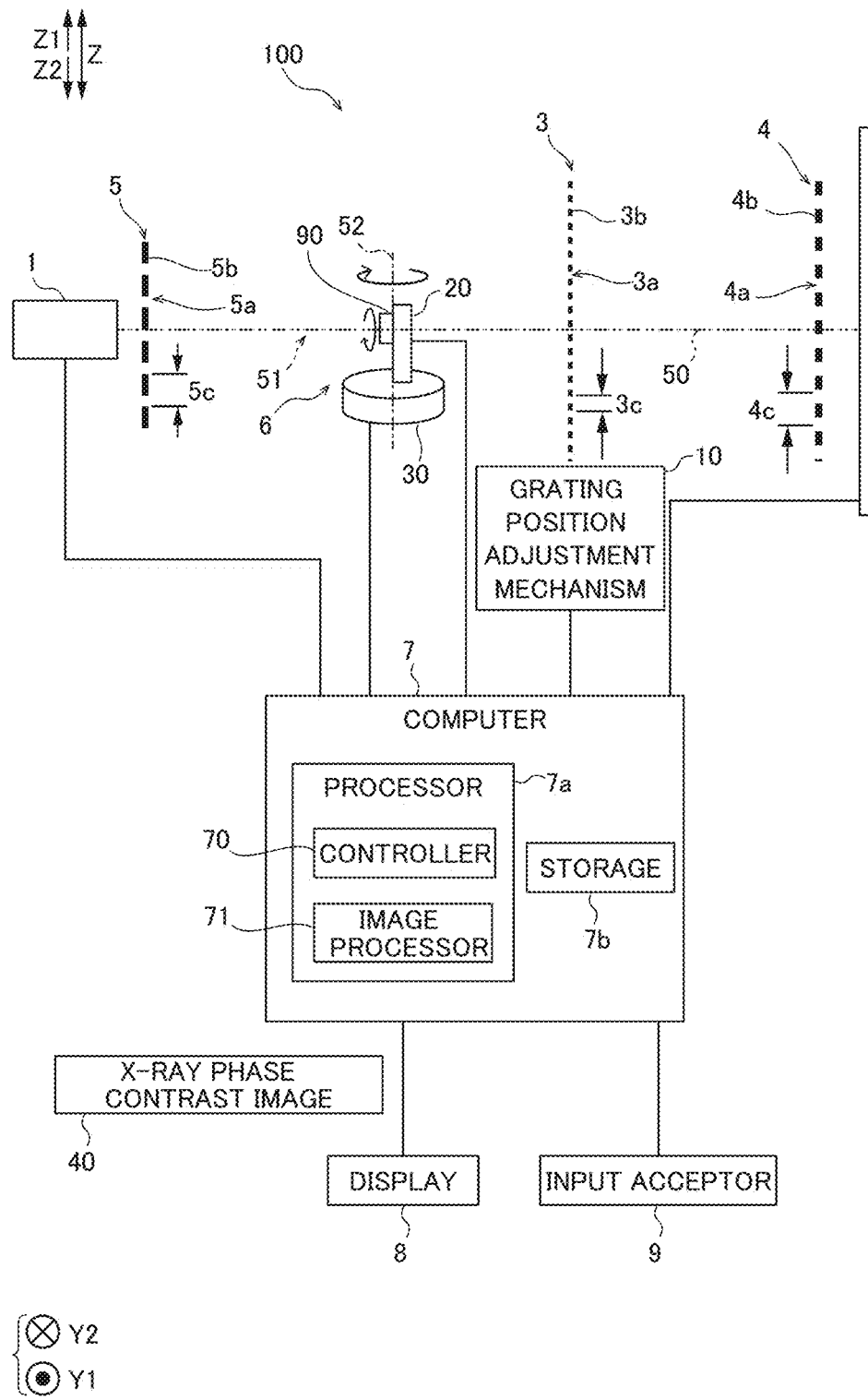
FIG. 1 is a schematic view showing the overall configuration of an X-ray phase imaging apparatus according to one embodiment.

As shown in FIG. 1, an X-ray phase imaging apparatus 100 is an apparatus using the Talbot effect whereby forming an image of the inside of a subject 90. The subject 90 is a member having a directivity in its X-ray scattering directions. For example, the subject 90 is CFRP. The X-ray phase imaging apparatus 100 includes an X-ray source 1, an X-ray detector 2, a plurality of gratings including first and second gratings 3 and 4, a subject rotation unit 6 for the X-ray phase imaging apparatus, a computer 7, a display 8, an input acceptor 9, and a grating position adjustment mechanism 10. In addition, in this embodiment, the plurality of gratings further includes a third grating 5.

In the X-ray phase imaging apparatus 100, the X-ray source 1, the third grating 5, the first grating 3, the second grating 4 and the X-ray detector 2 are arranged in this order in an X-ray irradiation axis 50 direction.

That is, the first and second gratings 3 and 4 are arranged between the X-ray source 1 and the X-ray detector 2. In this specification, an upward-downward direction is defined as a Z direction, and upward and downward directions are defined as Z1 and Z2 directions, respectively. Also, a direction from the X-ray source 1 toward the X-ray detector 2 is defined as an X direction, and one side is defined as an X1 direction side while another side is defined as an X2 direction side. Also, a direction orthogonal to the Z and X directions is defined as a Y direction, and one side is defined as a Y1 direction side while another side is defined as a Y2 direction side.

The X-ray source 1 is configured to irradiate the subject 90 with X-rays. Specifically, The X-ray source 1 is configured to generate X-rays when a high voltage is applied thereto.

The X-ray detector 2 is configured to detect X-rays radiated from the X-ray source 1. In addition, the X-ray detector 2 is configured to convert detected X-rays into electrical signals. The X-ray detector 2 is a flat panel detector (FPD), for example. The X-ray detector 2 is constructed of a plurality of conversion elements (not shown) and pixel electrodes (not shown) arranged on the plurality of conversion elements. The plurality of conversion elements and the pixel electrodes are aligned at predetermined cycles (pixel pitches) along the Z and Y directions. The detection signals (image signals) of the X-ray detector 2 is transmitted to an image processor 71 discussed later.

The first grating 3 is arranged between the X-ray source 1 and the X-ray detector 2, and is irradiated with X-rays from the X-ray source 1. The first grating 3 has slits $3a$ and X-ray phase changers $3b$ arranged at predetermined cycles (grating pitches) $3c$ along the Z direction. Each slit $3a$ and each X-ray phase changer $3b$ linearly extend along the Y direction. The first grating 3 is a so-called phase grating. The first grating 3 is arranged between the X-ray source 1 and the second grating 4, and is provided to form a self-image by X-rays radiated from the X-ray source 1 (by the Talbot effect). Note that the Talbot effect indicates that when coherent X-rays pass through a grating in which slits are formed, a grating image (self-image) is formed at a position away from the grating by a predetermined distance (Talbot distance).

The second grating 4 is irradiated with X-rays from the first grating 3. The second grating 4 has a plurality of X-ray transmitters $4a$ and X-ray absorbers $4b$ arranged at predetermined cycles (grating pitches) $4c$ along the Z direction. Each X-ray transmitter $4a$ and each X-ray absorber $4b$ linearly extend along the Y direction. The second grating 4 is a so-called absorption grating. The second grating 4 is arranged between the first grating 3 and the X-ray detector 2, and is configured to interfere with a self-image formed by the first grating 3. The second grating 4 is arranged at a position away from the first grating 3 by a Talbot distance in order to cause the self-image and the second grating 4 to interfere with each other.

The third grating 5 is arranged between the X-ray source 1 and the first grating 3. The third grating 5 has a plurality of slits $5a$ and X-ray absorbers $5b$ arranged at predetermined cycles (grating pitches) $5c$ along the Z direction. Each slit $3a$ and each X-ray absorber $5b$ linearly extend along the Y direction. In addition, each slit $5a$ and each X-ray absorber $5b$ extend in parallel to each other. The third grating 5 is arranged between the X-ray source 1 and the first grating 3, and is irradiated with X-rays from the X-ray source 1. The third grating 5 is configured to form X-rays passing through the slits 5a into line-light sources corresponding to positions of the slits 5a.

In this embodiment, the first, second and third gratings 3, 4 and 5 are orientated so that their grid patterns extend along the Y direction. Note that the grid patterns can be the slits 3a, the X-ray phase changers 3b, the X-ray transmitters 4a, the X-ray absorbers 4b, the slit 5a and the X-ray absorbers 5b.

The subject rotation unit 6 for the X-ray phase imaging apparatus includes first and second rotation mechanisms 20 and 30.

The first rotation mechanism 20 includes a subject holder 21 configured to hold the subject 90, and is configured to rotate the subject holder in a first rotating direction about a first axis 51 that becomes collinear with an X-ray irradiation axis 50 when the first rotation mechanism 20 faces the X-ray source 1 and passes through a center of the subject holder 21. The first rotation mechanism 20 will be discussed in detail later. The first rotation mechanism 20 is rotated by the second rotation mechanism 30 in a second rotating direction about a second axis 52 discussed later. Consequently, an extension direction of the first axis 51 will change in accordance with an angle of the first rotation mechanism 20 rotated by second rotation mechanism 30.

The second rotation mechanism 30 holds the first rotation mechanism 20, and is configured to rotate the first rotation mechanism 20 in the second rotating direction about the second axis 52 extending orthogonal to the first axis 51. The second rotation mechanism 30 will be discussed in detail later. The second axis 52 illustrated in FIG. 1 is an axis extending along the Z direction.

The computer 7 includes a processor 7a such as a central processing unit (CPU), a graphics processing unit (GPU) or a field-programmable gate array (FPGA) configured for image processing, and a memory such as a ROM (read only memory), a RAM (random access memory), etc., for example.

The processor 7a includes a controller 70 and the image processor 71. The controller 70 is configured to control the X-ray source 1, the grating position adjustment mechanism 10, the first rotation mechanism 20, the second rotation mechanism 30, etc. The controller 70 is software-configured as a function block implemented by various programs executed by the processor 7a. The controller 70 may be constructed of hardware with a dedicated processor (processing circuit).

The image processor 71 is configured to generate an X-ray phase contrast image 40 based on each intensity distribution of the X-rays detected by the X-ray detector 2 when images of the subject 90 are captured while the subject 90 is rotated by the first and second rotation mechanisms 20 and 30 in the first and second rotating directions. In this embodiment, the image processor 71 is configured to generate a three-dimensional X-ray phase contrast image when images of the subject 90 are captured while the subject 90 is rotated by the first and second rotation mechanisms 20 and 30. The image processor 71 is software-configured as a function block implemented by various programs executed by the processor 7a. The image processor 71 may be constructed of hardware with a dedicated processor (processing circuit). The configuration in which an X-ray phase contrast image 40 is generated by the image processor 71 will be discussed in detail later.

The X-ray phase imaging apparatus 100 captures images at a plurality of image-capture positions while rotating the subject 90 by means of the first and second rotation mechanisms 20 and 30 in the first and second rotating directions.

The image processor 71 generates a three-dimensional X-ray phase contrast image 40 based on the X-ray phase contrast images 40 captured at the plurality of image-capture positions. In this case, X-ray phase contrast images 40 captured at the image-capture positions are aligned.

A storage 7b is configured to store the X-ray phase contrast images 40 generated by the image processor 71, and various programs to be executed by the processor 7a. The storage 7b includes an HDD (Hard Disk Drive) or a non-volatile memory such as SSD (Solid State Drive).

The display 8 displays the X-ray phase contrast image 40 generated by the image processor 71. The display 8 includes an LCD monitor, for example.

The input acceptor 9 is configured to accept user instructions from users. The input acceptor 9 includes an input device such as keyboard or mouse, for example.

The grating position adjustment mechanism 10 is configured to move the first grating 3 along the X, Y and Z directions, and the rotating directions Rz, Rx and Ry about the axes corresponding to the Z, X and Y directions, respectively.

Grating Position Adjustment Mechanism

Figure 2:
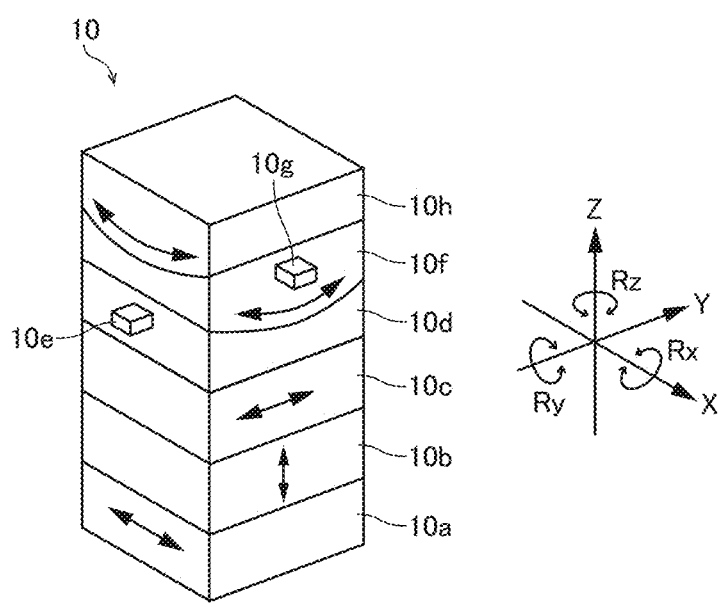
FIG. 2 is a diagram for explaining the configuration of a grating position adjustment mechanism of the X-ray phase imaging apparatus according to one embodiment.

As shown in FIG. 2, the grating position adjustment mechanism 10 includes X-directional, Z-directional and Y-directional translation mechanisms 10a, 10b and 10c, a translation mechanism connector 10d, a stage support driver 10e, a stage support 10f, a stage driver 10g, and a stage 10h.

The X-directional, Z-directional and Y-directional translation mechanisms 10a, 10b and 10c are configured movable along the X, Z and Y directions, respectively. Each of the X-directional, Z-directional and Y-directional translation mechanisms 10a, 10b and 10c includes a stepping motor, for example. The grating position adjustment mechanism 10 is configured to move the first grating 3 along the X, Z and Y directions, by means of the movement of the X-directional, Z-directional and Y-directional translation mechanisms 10a, 10b and 10c, respectively.

The stage support 10f supports the stage 10h, which holds the first grating 3, from the lower side (Z2 direction side) in FIG. 2. The stage driver 10g is configured to move the stage 10h back and forth along the X direction. The stage 10h has a convex bottom shape bulging toward the stage support 10f, and is configured to rotate about the axis corresponding to the Y direction (in the Ry direction) when moving back and forth along the X direction. Also, the stage support driver 10e is configured to move the stage support 10f back and forth along the Y direction. Also, the stage support 10f has a convex bottom shape bulging toward the translation mechanism connector 10d, and is configured to rotate about the axis corresponding to the X direction (in the Rx direction) when moving back and forth along the Y direction. In addition, the translation mechanism connector 10d is arranged rotatably about the axis corresponding to the Z direction (in the Rz direction) with respect to the X-directional translation mechanism 10a. With the configuration of the grating position adjustment mechanism 10 discussed above, an X-direction fringe scan can be made by the movement of the first grating 3 along the X direction by the X-directional translation mechanism 10a.

Configuration to Generate X-Ray Phase Contrast Image

The configuration in which an X-ray phase contrast image 40 is generated by the image processor 71 is now discussed with reference to FIG. 3. The image processor 71 uses intensity signal curves 41 and 42 acquired based on X-ray strength distributions detected by the X-ray detector 2 whereby generating the X-ray phase contrast image 40. The X-ray phase contrast image 40 includes absorption, phase differential and dark-field images. The intensity signal curve 41 is a curve representing a distribution of intensities of X-rays in a state in which the subject 90 is held. The intensity signal curve 42 is a curve representing a distribution of intensities of X-rays in a state in which the subject 90 is not held.

Figure 3:
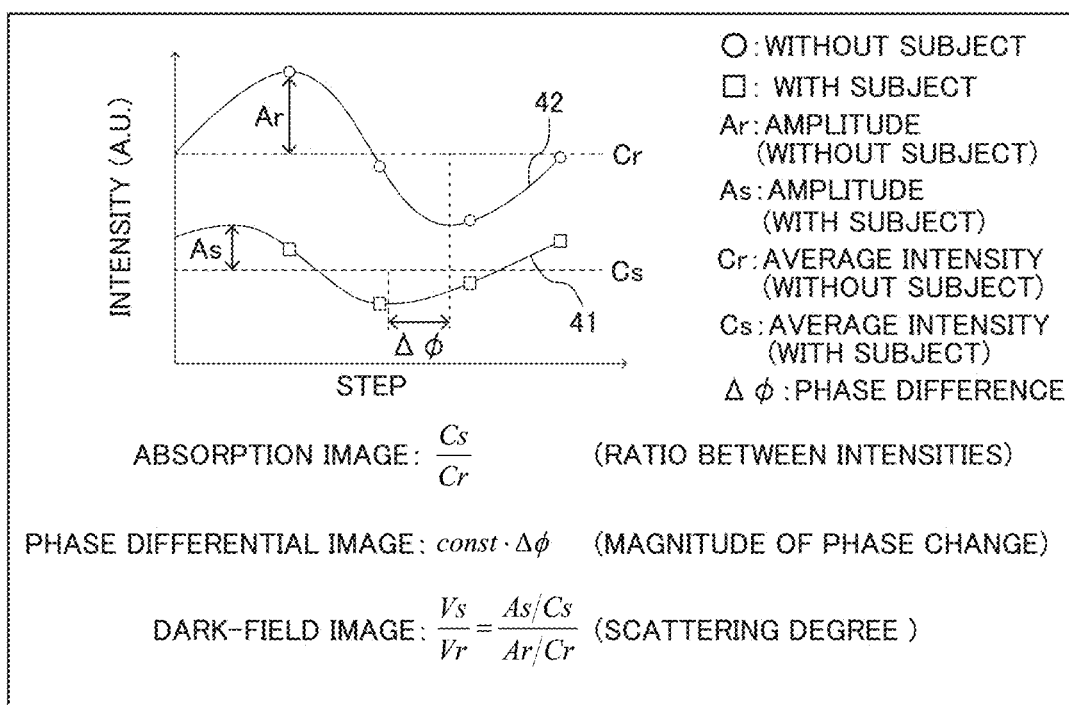
FIG. 3 is a schematic view for explaining the configuration in which an X-ray phase contrast image is generated.

As shown in FIG. 3, the absorption image can be generated based on the ratio between X-ray average intensities Cs and Cr of images captured with and without the subject 90 placed. The phase differential image can be generated based on multiplication between a phase difference $\Delta\varphi$ between the intensity signal curves 41 and 42 of images captured with and without the subject 90 placed, and a number obtained by predetermined calculation. The dark-field image can be generated by a ratio between visibilities (Vr) and (Vs) of images captured without and with the subject 90 placed. Vr can be obtained based on a ratio between an amplitude Ar and an average intensity Cr of the intensity signal curve 42. Vs can be obtained based on a ratio between an amplitude As and an average intensity Cs of the intensity signal curve 41.

Note that, in this embodiment, the image processor 71 is required to generate at least the dark-field image. In other words, the image processor 71 may generate neither the absorption image nor the phase differential image.

First and Second Rotation Mechanisms

The configurations of the first and second rotation mechanisms 20 and 30 according to this embodiment are now described with reference to FIGS. 4 to 6.

Figure 4:
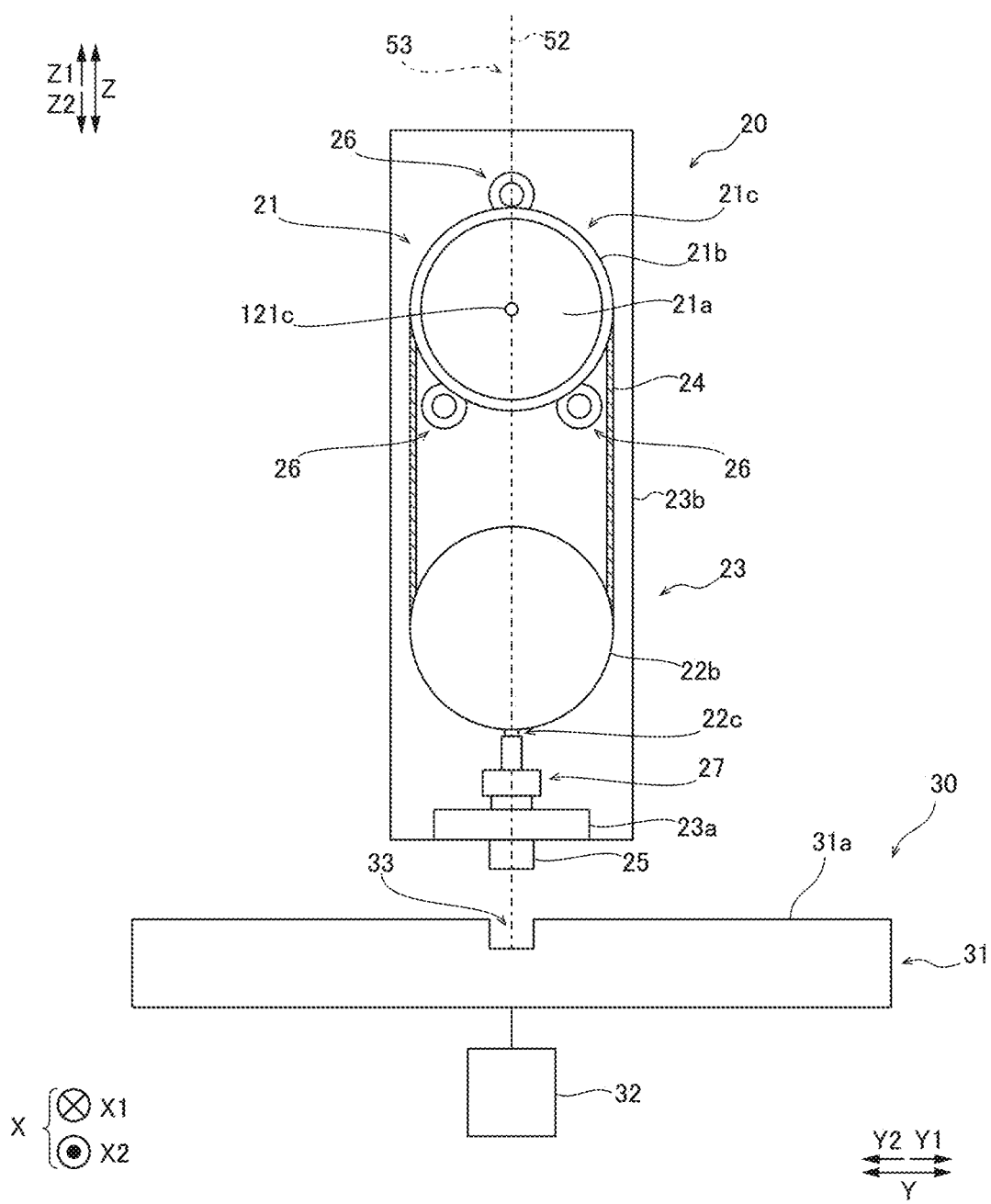
FIG. 4 is a schematic view of first and second rotation mechanisms according to one embodiment as viewed from an X2 direction side.

As shown in FIG. 4, the first rotation mechanism 20 includes the subject holder 21, a driver 22, and a driving force transmission member.

Subject Holder

The subject holder 21 is arranged in an X-ray irradiation area, and configured to hold the subject 90. In this embodiment, the subject holder 21 is formed of a first material having an X-ray transmittance greater than metal and an X-ray scattering degree smaller than the metal. Specifically, the subject holder 21 is formed of a resin material as the first material having an X-ray transmittance greater than a fluorocarbon resin and an X-ray scattering degree smaller than the fluorocarbon resin. Accordingly, even if the subject holder 21 is arranged in the X-ray irradiation area, it is possible to reduce appearance of artifacts. That is, the subject holder 21 can be arranged in the X-ray irradiation area. The resin material forming the subject holder 21 will be discussed in detail later. Note that holding the subject 90 includes not only placing the subject 90 on the subject holder 21 but also retaining the subject 90 on the subject holder 21. The "resin material" is an example of the "first material" in the claims.

The subject holder 21 includes a subject stage 21a having a plate-like shape and configured to hold the subject 90, and a first pulley 21b having a cylindrical shape and engaging the driving force transmission member discussed later. In this embodiment, the subject holder 21 further includes a roller guide 21c engaging bearings 26 discussed later. In this embodiment, the subject stage 21a, the first pulley 21b and the roller guide 21c are formed of the first material. That is, all of the subject stage 21a, the first pulley 21b and the roller guide 21c are formed of the resin material. The resin material forming the subject stage 21a, the first pulley 21b and the roller guide 21c will be discussed in detail later.

The subject stage 21a is configured to retain the subject 90. In this embodiment, the subject stage 21a is configured to retain the subject 90 by sticking the subject 90 thereto, for example. In addition, the subject stage 21a is coupled to the first pulley 21b, and is configured to rotate together with the first pulley 21b.

The first pulley 21b is coupled by the driving force transmission member to a second pulley 22b discussed later. When the second pulley 22b rotates, the rotation of the second pulley 22b is transmitted to the first pulley 21b through the driving force transmission member so that the first pulley 21b rotates together with the second pulley 22b.

The roller guide 21c is coupled to the first pulley 21b, and is configured to rotate together with the first pulley 21b. That is, the subject holder 21 is configured to rotate the subject stage 21a in response to the rotation of the first pulley 21b. In addition, the subject holder 21 is configured to guide the rotation of the subject stage 21a and the first pulley 21b by means of the roller guide 21c.

Driver and Driving Force Transmission Member

The driver 22 is configured to apply a driving force for rotating the subject holder 21. The driver 22 is spaced away from the subject holder 21 and arranged at a position outside the X-ray irradiation area. Specifically, as shown in FIG. 4, the driver 22 is arranged at a position away from the subject holder 21 on the Z2 direction side. The driver 22 includes an electric motor 22a (see FIG. 5) producing the driving force, and the second pulley 22b.

The driving force transmission member is configured to rotate the subject holder 21 by means of the driving force applied from the driver 22. A member of the driving force transmission member that is arranged in the X-ray irradiation area is formed of the first material. The driving force transmission member includes a belt member 24 engaging the first pulley 21b. The belt member 24 is formed of a rubber material. Specifically, the belt member 24 is formed of chloroprene rubber as the rubber material. The belt member 24 has a ring shape, and engages the first and second pulleys 21b and 22b.

The second pulley 22b is formed of a metal material as the second material. The second pulley 22b is coupled to the electric motor 22a. The second pulley 22b is configured to be rotated by a driving force produced by the electric motor 22a. The second pulley 22b is coupled to the first pulley 21b by the belt member 24. In other words, the first rotation mechanism 20 is a so-called belt-and-pulley mechanism. The metal material as the second material includes a ferrous material, for example.

Photo Sensor

In this embodiment, the first rotation mechanism 20 includes a photo sensor 27 for acquiring a rotation angle of the driver 22. The photo sensor 27 includes an optical sensor.

The photo sensor 27 is arranged on the second rotation mechanism 30 side (Z2 direction side) of the support member 23 discussed later in a state in which the first rotation mechanism 20 is retained on the second rotation mechanism 30. The photo sensor 27 includes a light emitter (not shown) and a light receiver (not shown). The controller 70 can detect whether any member exists between the light emitter and the light receiver based on whether the light receiver detects light emitted by the light emitter.

As shown in FIG. 4, the second pulley 22b includes a plate member 22c. The plate member 22c has a rectangular shape, and is configured to cut off light emitted from the light emitter of the photo sensor 27 at a predetermined position. That is, the plate member 22c will be detected at the predetermined position by the photo sensor 27. In this embodiment, a position where the plate member 22c is detected by the photo sensor 27 is defined as the origin of the second pulley 22b. The controller 70 is configured to acquire a rotation angle of the second pulley 22b in accordance with the number of pulses provided to the electric motor 22a after the second pulley 22b is positioned at the origin position.

In other words, the controller 70 can acquire an angle of the subject holder 21 rotated together with the second pulley 22b by the belt member 24 based on the acquisition of the rotation angle of the second pulley 22b. In order to reduce irradiation of the photo sensor 27 with X-rays, the photo sensor 27 is preferably provided with a protection member (not shown) formed of a metal material.

Support Member

The first rotation mechanism 20 is formed of the resin material and includes the support member 23 rotatably supporting the subject holder 21 on one side of the support member. The support member 23 includes a joint 23a united with the second rotation mechanism 30, a support 23b supporting the subject holder 21, a cover 23c (see FIG. 5). In this embodiment, the joint 23a is arranged on another side (Z2 direction side) of the support 23b. The subject holder 21 is rotatably held by the support 23b in its Z1 direction side. The cover 23c is arranged on the Z1 direction side of the support 23b, and is configured to cover the first pulley 21b and the roller guide 21c. The resin material forming the support member 23 will be discussed in detail later.

Engagement Portion

In the present embodiment, the support member 23 has an engagement portion 25 configured to engage the second rotation mechanism 30 so that the second axis 52 becomes collinear with a vertical line 53 extending on a surface of the subject holder 21 and passing through a rotational center of the subject holder 21 when the first rotation mechanism 20 is held by the second rotation mechanism 30. In this embodiment, the joint 23a is provided with the engagement portion 25.

Second Rotation Mechanism

The second rotation mechanism 30 includes a mount 31, a driver 32 rotating the mount 31 about the second axis 52, an origin sensor (not shown) detecting an origin of the mount 31 in the rotation. The mount 31 has a circular shape in a top view. A mount surface 31a on which the first rotation mechanism 20 is held is arranged on the Z1 direction side of the mount 31. In this embodiment, the second rotation mechanism 30 retains the first rotation mechanism 20 by means of the mount 31 (mount surface 31a) onto which the first rotation mechanism 20 is held.

In this embodiment, the second rotation mechanism 30 is configured to removably hold the first rotation mechanism 20. The mount surface 31a has a recessed part 33 engaging the engagement portion 25. The recessed part 33 is located at a position corresponding to a rotational center of the mount surface 31a.

In this embodiment, the first rotation mechanism 20 is formed of the resin material, and includes the bearings 26 engaging the outer periphery of the subject holder 21, as shown in FIG. 4. Specifically, the bearings 26 are arranged on the support member 23 discussed later. The bearings 26 engage the outer periphery of the roller guide 21c. That is, the subject holder 21 is supported through the bearings 26 by the support member 23. The bearings 26 are configured to perform Z-direction positioning of the subject holder 21, and to guide rotation of the subject holder 21 about the first axis 51. In this embodiment, as shown in FIG. 4, the first rotation mechanism 20 includes one bearing 26 engaging the upper part (Z1 direction side) of the outer periphery of the roller guide 21c, and two bearings 26 engaging the lower part (Z2 direction side) of the outer periphery of the roller guide 21c. Note that more than three bearings 26 may be provided as long as they can perform Z-directional positioning of the subject holder 21 and facilitate rotation of the subject holder 21 about the first axis.

Through-Hole

A through-hole 121c for detecting an inclination of the first axis 51 of the first rotation mechanism 20 is formed at the rotational center of the subject holder 21 so as to penetrate a holding surface 121a (see FIG. 5) of the subject holder 21 along the first axis 51.

When images of the subject 90 are captured in a state in which the first axis 51 of the first rotation mechanism 20 is inclined, alignment of the subject 90 will be complicated. For this reason, in this embodiment, the image processor 71 (see FIG. 1) is configured to previously acquire inclinations of the first axis 51, and to perform alignment of the X-ray phase contrast images 40 whose inclinations corresponding to the first axis 51 are to be corrected. Specifically, the image processor 71 can detect the inclination of the first axis of the first rotation mechanism 20 based on an image of the through-hole 121c formed in each X-ray phase contrast image 40.

Figure 5:
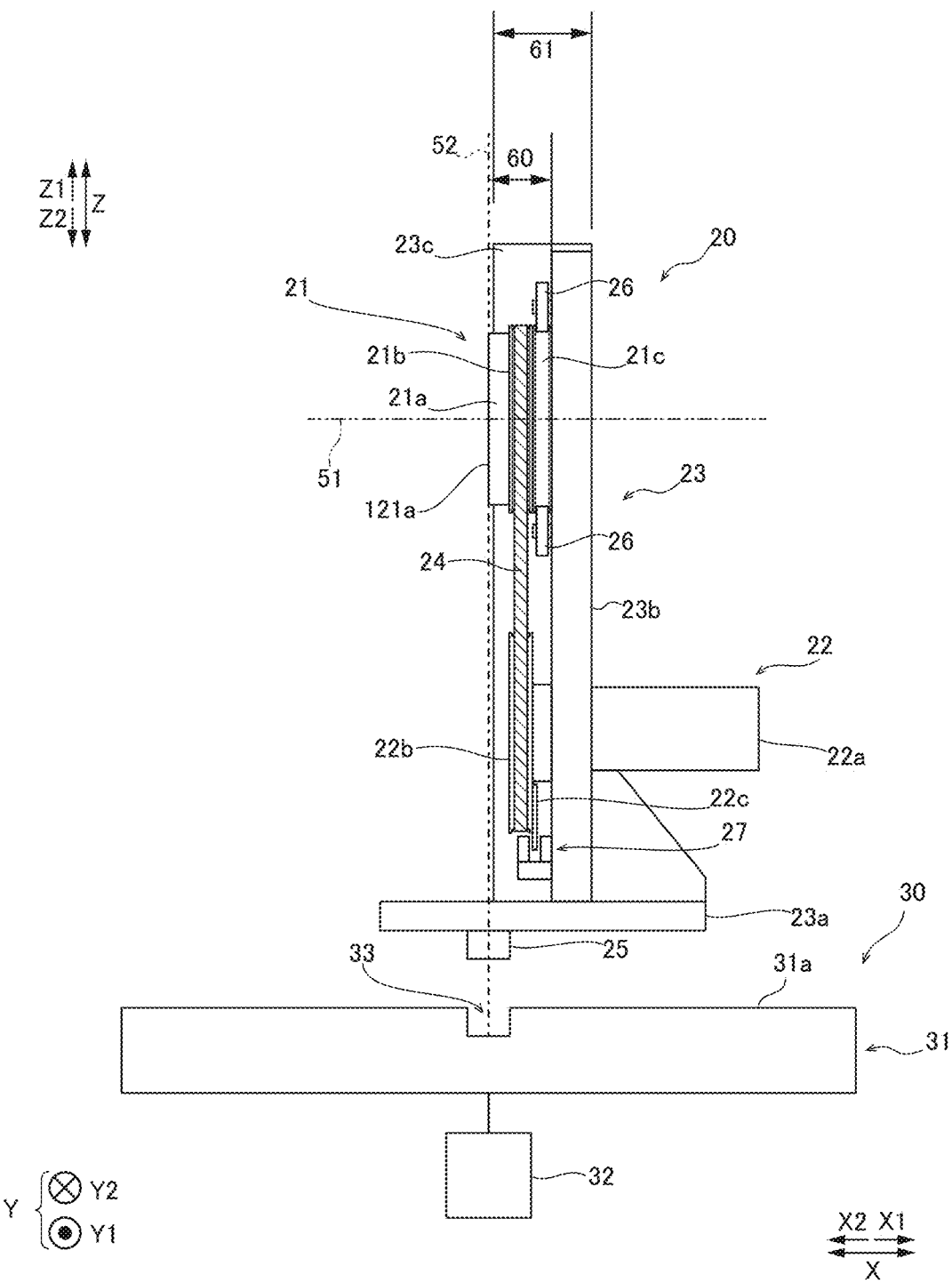
FIG. 5 is a schematic view of first and second rotation mechanisms according to one embodiment as viewed from a Y1 direction side.
Figure 6:
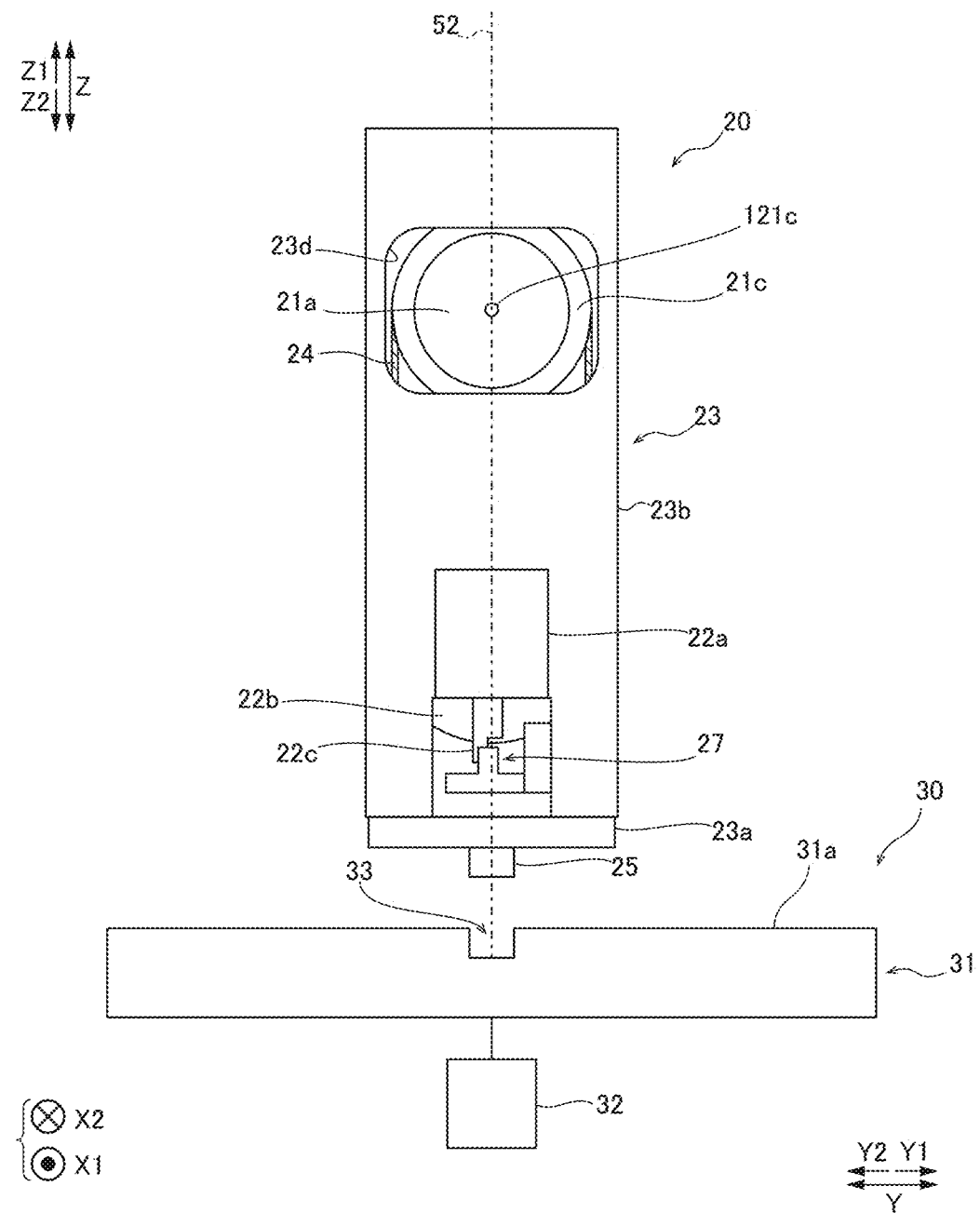
FIG. 6 is a schematic view of first and second rotation mechanisms according to one embodiment as viewed from an X1 direction side.

As shown in FIG. 5, the subject holder 21 is arranged on one side in the first axis 51 extension axis of the support 23b. In the example shown in FIG. 5, the subject holder 21 is arranged on the X2 direction side of the support 23b. The second pulley 22b is arranged on a side in the first axis 51 extension direction of the support 23b in which the subject holder 21 is provided. In the example shown in FIG. 5, the second pulley 22b is arranged on the X2 direction side of the support 23b. The electric motor 22a is arranged on another side in the first axis 51 extension direction of the support 23b. In the example shown in FIG. 5, the electric motor 22a is arranged on the X1 direction side of the support 23b.

As shown in FIG. 5, a thickness 60 of the subject holder 21 along the first axis 51 is smaller than a thickness 61 of the support member 23 along the first axis 51. Note that the thickness 61 of the support member 23 refers to the total thickness of a thickness of the cover 23c and a thickness of the support 23b along the X direction. In the example shown in FIG. 5, a part on the Y1 direction side of the cover 23c is not shown for ease of illustration.

In this embodiment, as shown in FIG. 5, the first rotation mechanism 20 is retained on the second rotation mechanism 30 so that the first and second axes 51 and 52 intersect each other on the holding surface 121a of the subject stage 21a. Consequently, even when the second rotation mechanism 30 rotates the subject 90 in the second rotating direction, it is possible to reduce adverse effects on sensitivity of the plurality of gratings.

Opening of Support Member

In this embodiment, both of the subject holder 21 and the support member 23 are formed of the resin material as the first material. The resin material has higher X-ray transmittance as compared with the metal material. However, the X-ray transmittance of even such a resin material decreases with its thickness. To address this, in this embodiment, the support member 23 has an opening 23d as shown in FIG. 6. The support member 23 retains the subject holder 21 so that the subject stage 21a is arranged in a position corresponding to the opening 23d. The size along the Z direction of the opening 23d is greater than the size along the X direction of the subject stage 21a. The size along the Y direction of the opening 23d is greater than the size along the Y direction of the subject stage 21a. Consequently, in a state in which the subject holder 21 faces the X-ray source 1, it is possible to reduce an attenuation of X-rays passing through the subject holder 21 attenuated by the support member 23.

The configurations of the subject stage 21a, the first pulley 21b and the roller guide 21c are now described with reference to FIGS. 7 and 8.

As shown in FIG. 7(A), the through-hole 121c is formed in the holding surface 121a of the subject stage 21a. Specifically, the through-hole 121c is formed at a rotational center of the subject stage 21a.

As shown in FIG. 7(B), the first pulley 21b has an opening 121b. In other words, the first pulley 21b has a ring shape.

As shown in FIG. 7(C), the roller guide 21c has an opening 121d. In other words, the roller guide 21c has a ring shape.

As shown in FIGS. 7(A) to (C), a diameter 70 of the subject stage 21a is smaller than diameters 71 and 72 of the first pulley 21b and the roller guide 21c. Here, the diameter 71 of the first pulley 21b refers to an outside diameter of the first pulley 21b. Also, the diameter 72 of the roller guide 21c is an outside diameter of the roller guide 21c.

Diameters 73 and 74 of the openings 121b and 121d of the first pulley 21b and the roller guide 21c are greater than the diameter 70 of the subject stage 21a. Since it is possible to prevent the subject stage 21a from fitting into the opening 121b when the subject stage 21a is joined to the first pulley 21b, the subject stage 21a can be easily joined to the first pulley 21b. Here, the diameter 73 of the opening 121b of the first pulley 21b refers to an inside diameter of the first pulley 21b. Also, the diameter 74 of the opening 121b of the roller guide 21c is an inside diameter of the roller guide 21c.

As shown in FIG. 8, the subject holder 21 is formed by arranging the subject stage 21a, the first pulley 21b and the roller guide 21c in this order in a direction from the X2 direction side to the X1 direction side and joining them to each other.

As shown in FIG. 8, the subject holder 21 has a hollow structure formed by closing the opening 121b on one side of the first pulley 21b by the subject stage 21a. Specifically, the openings 121b and 121d of the first pulley 21b and the roller guide 21c are closed by the subject stage 21a by arranging the subject stage 21a, the first pulley 21b and the roller guide 21c from the X2 direction side to the X1 direction side in the subject holder 21. Consequently, the subject holder 21 has the hollow structure.

Resin Material Selection

Figures 9, 10:
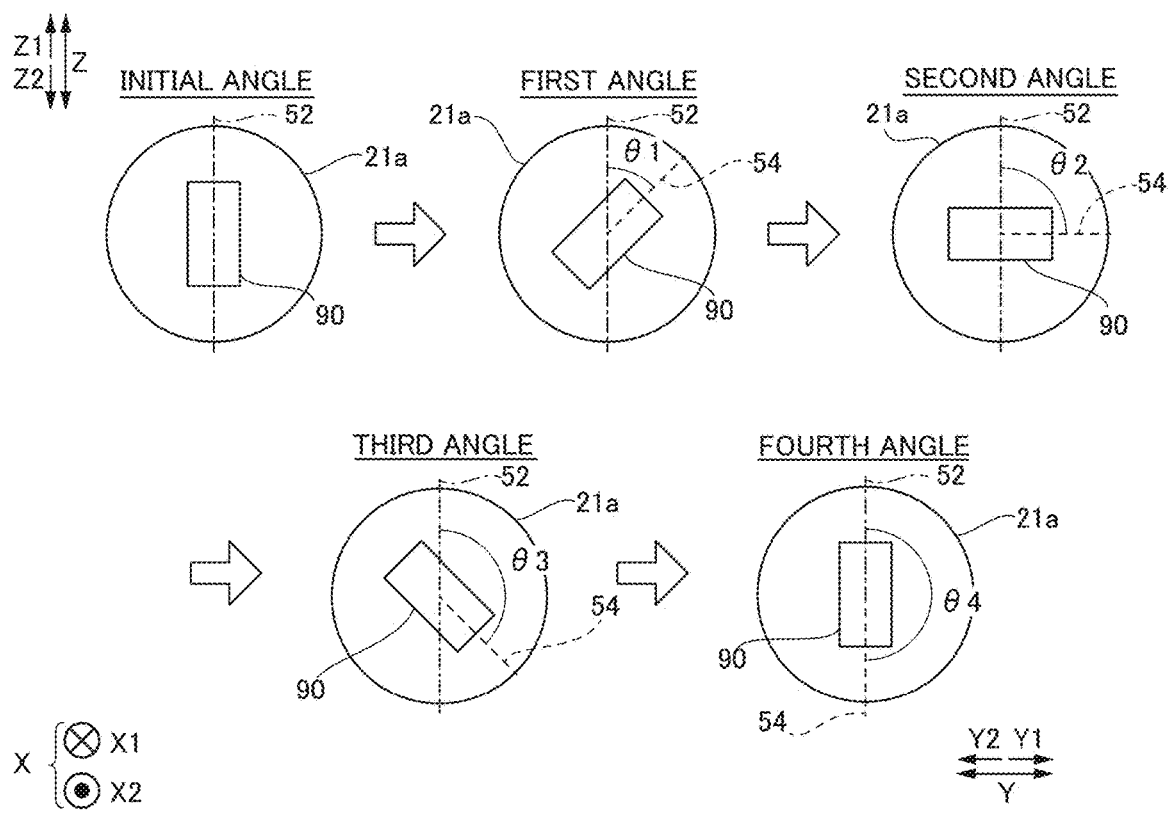
FIG. 9 is a diagram showing experimental results of resins forming the subject holder according to one embodiment.
FIG. 10 is a schematic view for explaining the configurations in which a subject is rotated by the first rotation mechanism.

Experiment was conducted to research X-ray transmittances and X-ray scattering degrees in conditions in which PEEK (Poly Ether Ether Ketone), ABS (Acrylonitrile Butadiene Styrene), PET (Polyethylene terephthalate), poly vinyl acetate, acrylic, Duracon (registered trademark), nylon, Teflon (registered trademark) (fluorocarbon resin), PE (Polyethylene) and PC (Polycarbonate) are used as the resin material forming the subject holder 21 (subject stage 21a, first pulley 21b and roller guide 21c) and the support member 23 (joint 23a, support 23b and cover 23c) as shown in experimental results 80 of FIG. 9.

Specifically, experiment was conducted to research X-ray scattering degrees and X-ray transmittances of the resin materials when the resin materials having a thickness shown in an item column 80a as a transmission length were irradiated with X-rays. The X-ray scattering degrees and transmittances of the resin materials are indicated as the experimental results 80 in scattering and transmittance item columns 80b and 80c, respectively, in FIG. 9.

The scattering item column 80b indicates the X-ray scattering degrees by the resin materials in the experimental results 80. A greater value in the scattering item column 80b represents a smaller scattering degree. The transmittance item column 80c indicates the transmittance of X-rays applied to the resin materials in the experimental results 80. A greater value in the transmittance item column 80c represents a greater transmittance of X-rays.

According to the experiment conducted to research X-ray scattering degrees and X-ray transmittances of the resin materials, the X-ray scattering degrees and the X-ray transmittances show that PEEK, ABS, PET, acrylic, Duracon, nylon, PE and PC are more preferable materials forming (subject stage 21a, first pulley 21b and roller guide 21c) and the support member 23 (joint 23a, support 23b and cover 23c) than poly vinyl acetate and Teflon (registered trademark) (fluorocarbon resin). Acrylic has water absorbency. Consequently, it is confirmed that PEEK, ABS, PET, Duracon, nylon, PE and PC are suitable for resin materials for (subject stage 21a, first pulley 21b and roller guide 21c) and the support member 23 (joint 23a, support 23b and cover 23c).

In this embodiment, the subject stage 21a, the first pulley 21b, the roller guide 21c, the joint 23a and the support 23b are formed of PEEK as the resin material from the viewpoint of its X-ray scattering degree, X-ray transmittance, mechanical strength, durability against X-rays and workability. The cover 23c is formed of acrylic from the viewpoint of visibility.

Rotation of Subject by First Rotation Mechanism

Rotation in the first rotating direction of the subject 90 by the first rotation mechanism 20 is now described with reference to FIG. 10.

In an example shown in FIG. 10, the subject 90 is rotated in the first rotating direction by the first rotation mechanism 20 so that the angle in the first rotating direction is changed from the initial angle of zero degree to a fourth angle θ4 of 180 degrees. Here, the initial angle refers to the origin. The angle in the first rotating direction of the subject 90 refers to an angle that is formed by the second axis 52 and an imaginary line 54 passing through the center of the subject 90 and extending along a longitudinal axis of the subject 90.

In this embodiment, the first rotation mechanism 20 rotates the subject 90 in the first rotating direction by a predetermined angle so that the subject 90 is rotated in the first rotating direction to a first angle θ1, a second angle θ2, a third angle θ3 and the fourth angle θ4. In this embodiment, images are captured at rotation angles of a predetermined angle to the fourth angle θ4.

Rotation Range of Subject Holder

In this embodiment, as shown in FIG. 10, the first rotation mechanism 20 is configured to be able to rotate the subject holder 21 not smaller than 180 degrees in the first rotating direction. Specifically, since the first rotation mechanism 20 is configured to rotate the second pulley 22b so as to rotate the subject holder 21, the subject 90 can be rotated 360 degrees or more.

Rotation of First Rotation Mechanism by Second Rotation Mechanism

Rotation in the second rotating direction of the subject 90 by the second rotation mechanism 30 is now described with reference to FIG. 11.

Figure 11:
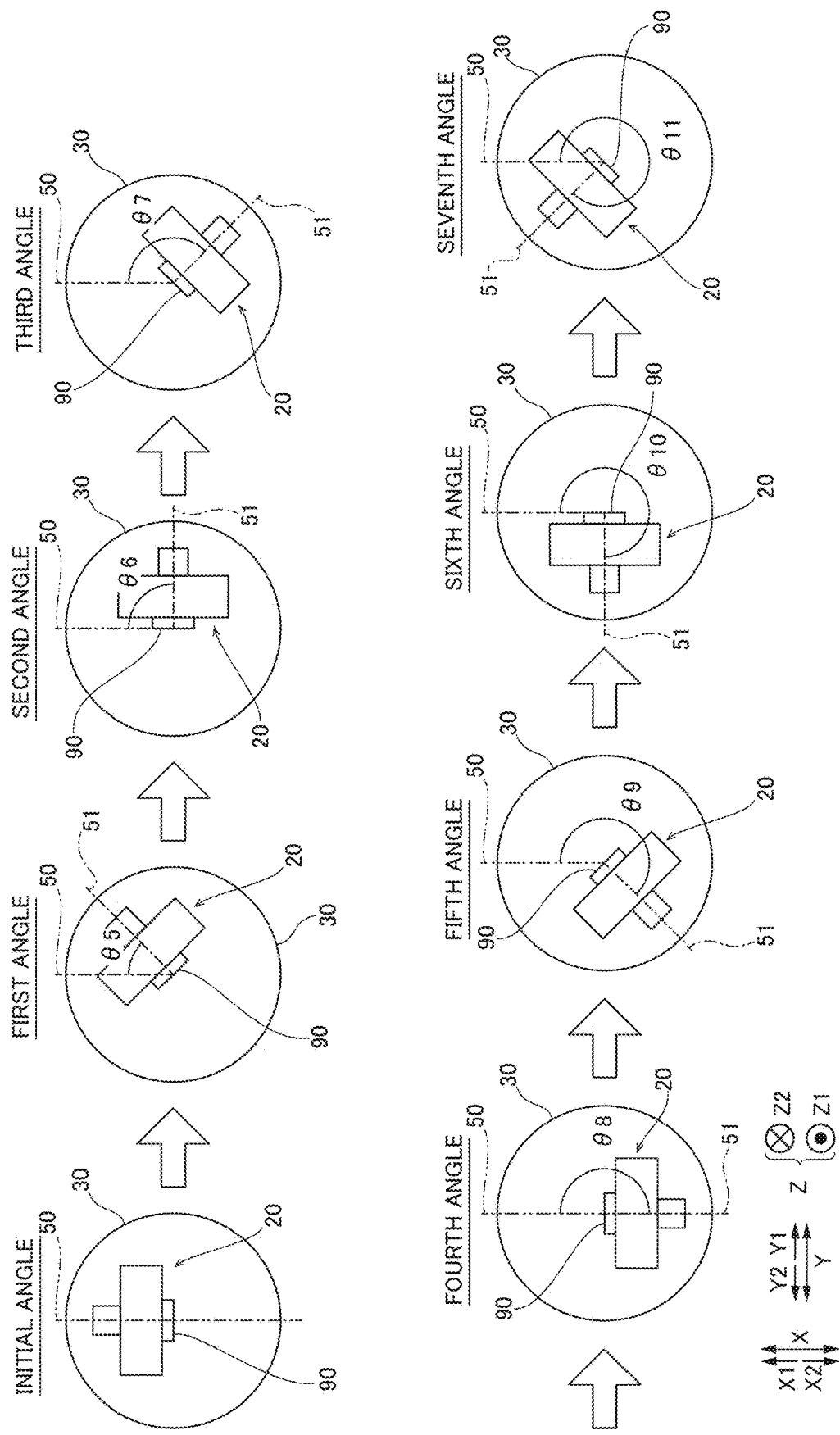
FIG. 11 is a schematic view for explaining the configurations in which the first rotation mechanism is rotated by the second rotation mechanism according to one embodiment.

In an example shown in FIG. 11, the second rotation mechanism 30 rotates the subject 90 together with the first rotation mechanism 20 in the second rotating direction from the initial angle (zero degree) to a seventh angle θ11. The angle in the second rotating direction of the subject 90 refers to an angle that is formed by the X-ray irradiation axis 50 and the first axis 51.

In this embodiment, the second rotation mechanism 30 rotates the subject 90 in the second rotating direction by a predetermined angle so that the subject 90 is rotated in the second rotating direction to a first angle θ5, to a second angle θ6, a third angle θ7, fourth angle θ8, a fifth angle θ9, a sixth angle θ10 and the seventh angle θ11. In addition, images are captured at each rotation angle in the second rotating direction while the subject is intermittently rotated in the first direction from the initial angle to the fourth angle θ4 by the first rotation mechanism 20.

In this embodiment, as shown in FIG. 11, the second rotation mechanism 30 is configured to rotate the first rotation mechanism 20 at least 360 degrees.

A flow of imaging processing by the X-ray phase imaging apparatus 100 according to this embodiment is now described with reference to FIG. 12.

In step 101, the controller 70 controls the first and second rotation mechanisms 20 and 30 so as to position the subject 90 at the initial angle in the first rotating direction and the initial angle in the second rotating direction (origin). In addition, the controller 70 controls the X-ray source 1 and the grating position adjustment mechanism 10 so as to capture an image of the subject 90.

In step 102, the controller 70 controls the second rotation mechanism 30 so as to rotate the subject 90 in the second rotating direction. In processing of step 102, the controller 70 rotates the subject 90 by the predetermined rotation angle in the second rotating direction.

In step 103, the controller 70 controls the X-ray source 1 and the grating position adjustment mechanism 10 so as to capture an image of the subject 90.

In step 104, the controller 70 determines whether images are captured at all of the predetermined angles in the first rotating direction. If images are not captured at all of the predetermined angles in the first rotating direction, the procedure goes to step 105. If images are captured at all of the predetermined angles in the first rotating direction, the procedure goes to step 106.

In step 105, the controller 70 controls the first rotation mechanism 20 so as to rotate the subject 90 in the first rotating direction. In processing of step 105, the controller 70 rotates the subject 90 by the predetermined rotation angle in the first rotating direction. Subsequently, the procedure goes to step 103.

If the procedure goes from step 105 to step 106, in step 106, the controller 70 controls the first rotation mechanism 20 so as to rotate the subject 90 to the initial angle (origin) in the first rotating direction. If the subject 90 has been positioned at the initial angle (origin) in the first rotating direction, the processing of step 103 is omitted.

In step 107, the controller 70 determines whether images are captured at all of the predetermined angles in the second rotating direction. If images are not captured at all of the predetermined angles in the second rotating direction, the procedure goes to step 102. If images are captured at all of the predetermined angles in the second rotating direction, the procedure ends.

That is, the X-ray phase imaging apparatus 100 according to this embodiment captures images of the subject 90 at all of the predetermined angles in the first rotating direction while rotating the subject 90 in the first rotating direction in a state in which the subject 90 is arranged at the predetermined angle in the second rotating direction. This processing is executed at all of the predetermined angles in the second rotating direction so that a three-dimensional X-ray phase contrast image 40.

Effect Of The Invention

In this embodiment, the following advantages are obtained.

In this embodiment, as discussed above, the X-ray phase imaging apparatus 100 includes the X-ray source 1 configured to irradiate the subject 90 with X-rays, the X-ray detector 2 configured to detect the X-rays radiated from the X-ray source 1, the plurality of gratings arranged between the X-ray source 1 and the X-ray detector 1, and including the first grating 3 to be irradiated with X-rays by the X-ray source 1 and the second grating 4 to be irradiated with the X-rays from the first grating 3, the subject holder 21 arranged in the X-ray irradiation area and configured to hold the subject 90, and the image processor 71 configured to generate an X-ray phase contrast image 40 based on an intensity distribution of the X-rays detected by the X-ray detector 2, wherein the subject holder 21 is formed of the first material having an X-ray transmittance greater than metal and an X-ray scattering degree smaller than the metal.

Since the subject holder 21 configured to hold the subject 90 is formed of the first material having an X-ray transmittance greater than metal and an X-ray scattering degree smaller than the metal, even when the subject holder 21 is arranged in the X-ray irradiation area, it is possible to reduce appearance of artifacts due to the subject holder 21 as compared with the configuration in which the subject holder 21 is formed of a metal material.

In addition, the following additional advantages can be obtained by the aforementioned embodiment added with configurations discussed below.

That is, the X-ray phase imaging apparatus 100 according to the aforementioned embodiment further includes the first rotation mechanism 20 including the subject holder 21, and configured to rotate the subject holder 21 in the first rotating direction about the first axis 51, which becomes collinear with the X-ray irradiation axis 50 when the first rotation mechanism 20 faces the X-ray source 1 and passes through a center of the subject holder 21. Accordingly, in a state in which the subject holder 21 is arranged in the X-ray irradiation area, in the configuration in which the first rotation mechanism 20 can rotate the subject 90 about the first axis 51, which becomes collinear with the X-ray irradiation axis 50 when the first rotation mechanism 20 faces the X-ray source 1, it is possible to increase the angular range available to rotate the subject 90 about the first axis 51. Consequently, the X-ray phase imaging apparatus 100 capable of reducing appearance of artifacts while increasing the angular range available to rotate the subject 90 can be provided.

In this embodiment, as discussed above, the subject holder 21 is formed of a resin material as the first material having an X-ray transmittance greater than a fluorocarbon resin and an X-ray scattering degree smaller than the fluorocarbon resin. Consequently, since the subject holder 21 is formed of a resin material as the first material having a greater X-ray transmittance and a smaller X-ray scattering degree than a fluorocarbon resin, which has a greater X-ray transmittance and a smaller X-ray scattering degree than a metal material, it is possible to reduce appearance of artifacts as compared with a case in which the subject holder 21 is formed of the fluorocarbon resin.

In this embodiment, as discussed above, the first rotation mechanism 20 is configured to be able to rotate the subject holder 21 not smaller than 180 degrees in the first rotating direction. Accordingly, it is possible to increase the angular range available to capture images as compared with a case in which images are captured by means of the rotation mechanism that can rotate 90 degrees in the first rotating direction. As a result, since the angle of the subject 90 arrangeable with respect to the plurality of gratings can be increased, an image of the inner structure of the subject 90 can be precisely formed. In addition, since rotation of the subject 90 not smaller than 180 degrees in the first rotating direction allows precise image formation of the inner structure of the subject 90, when images of the subject 90 having a directivity in its X-ray scattering directions are captured, images can be captured at rotation angles such as 45 and 135 degrees, which provide slant orientations of the subject 90 with respect to the gratings and have a difference of 90 degrees from each other. Consequently, since more detailed information such as the X-ray scattering directivity of the subject 90 can be acquired, users can precisely know the internal structure of the subject 90.

In this embodiment, as discussed above, the first rotation mechanism 20 includes the driver 22 configured to apply a driving force for rotating the subject holder 21, and the driving force transmission member configured to rotate the subject holder 21 by means of the driving force applied from the driver 22, wherein a member of the driving force transmission member that is arranged in the X-ray irradiation area is formed of the first material, and the driver 22 is spaced away from the subject holder 21 and arranged at a position outside the X-ray irradiation area. Accordingly, even when a driver such as an electric motor typically formed of metal materials is provided, it is possible to easily prevent the metal members from coming into the X-ray irradiation area. Consequently, it is possible to easily reduce appearance of artifacts in the X-ray phase contrast images 40 caused by the metal members.

In this embodiment, as discussed above, the first rotation mechanism 20 is formed of the first material (resin material) and includes the support member 23 rotatably supporting the subject holder 21 on one side of the support member, and the thickness 60 of the subject holder 21 along the first axis 51 is smaller than the thickness 61 of the support member 23 in the first axis 51. Accordingly, since the thickness 60 of the subject holder 21 along the first axis 51 is smaller than the thickness 61 of the support member 23 along the first axis 51, it is possible to reduce an attenuation of X-rays attenuated by the subject holder 21. Consequently, since the intensity signal curves 41 and 42 acquired based on X-ray strength distributions detected by the X-ray detector 2 can be precisely acquired, it is possible to precisely generate the X-ray phase contrast images 40.

In this embodiment, as discussed above, the subject holder 21 includes the subject stage 21a having a plate-like shape and configured to hold the subject 90, and the first pulley 21b having a cylindrical shape and engaging the driving force transmission member, and has a hollow structure formed by closing the opening 121b on one side of the first pulley 21b with the subject stage 21a. Accordingly, the thickness 60 of the subject holder 21 along the first axis 51 can be reduced as compared with a case in which the subject holder 21 has a solid structure. Consequently, it is possible to reduce an attenuation of X-rays attenuated by the subject holder 21.

In this embodiment, as discussed above, the driving force transmission member includes the belt member 24 engaging the first pulley 21b, and the belt member 24 is formed of a rubber material. Accordingly, it is possible to reduce an attenuation and scattering of X-rays caused by the belt member 24 as compared with the configuration in which a metal member is used as the driving force transmission member. Consequently, it is possible to reduce appearance of artifacts in the X-ray phase contrast images 40 caused by the belt member 24.

In this embodiment, as discussed above, the first pulley 21b is formed of the first material (resin material), wherein the driver 22 includes the electric motor 22a configured to produce a driving force, and the second pulley 22b formed of a metal material as the second material and coupled to the first pulley 21b by the belt member 24. Accordingly, appearance of artifacts when the subject 90 is rotated can be reduced by the first pulley 21b that is formed of the first material (resin material) to be arranged in the X-ray irradiation area, and in addition to this since the second pulley 22b that is formed of a metal material can reduce irradiation of the driver 22 with X-rays it is possible to prevent a failure of the driver 22 caused by X-rays.

In this embodiment, as discussed above, the second rotation mechanism 30 holding the first rotation mechanism 20 and configured to rotate the first rotation mechanism 20 in the second rotating direction about the second axis 52 extending orthogonal to the first axis 51 is further provided, wherein the second rotation mechanism 30 is configured to removably hold the first rotation mechanism 20, and the support member 23 has the engagement portion 25 configured to engage the second rotation mechanism 30 so that the second axis 52 becomes collinear with the vertical line 53 extending on a surface of the subject holder 21 and passing through the rotational center of the subject holder 21 when the first rotation mechanism 20 is held by the second rotation mechanism 30. Consequently, the first rotation mechanism 20 can be easily positioned by the engagement portion 25 when arranged onto the second rotation mechanism 30.

In this embodiment, as discussed above, the first rotation mechanism 20 is formed of the first material (resin material), and further includes the bearings 26 engaging the outer periphery of the subject holder 21. Consequently, the subject holder 21 is stably rotated by the bearings 26, and in addition to this it is possible to reduce appearance of artifacts caused by the bearings 26.

In this embodiment, as discussed above, the through-hole 121c for detecting an inclination of the first axis 51 of the first rotation mechanism 20 is formed at the rotational center of the subject holder 21 so as to penetrate the holding surface 121a of the subject holder 21 along the first axis 51. Consequently, since inclinations of the first axis 51 of the first rotation mechanism 20 can be detected by means of the through-hole 121c, when the X-ray phase contrast images 40 captured at the plurality of image-capture positions are aligned, the inclinations of the first axis 51 corresponding to the images can be easily corrected.

MODIFIED EXAMPLE

The embodiment disclosed this time must be considered as illustrative in all points and not restrictive. The scope of the present invention is not shown by the above description of the embodiments but by the scope of claims for patent, and all modifications (modified example(s)) within the meaning and scope equivalent to the scope of claims for patent are further included.

For example, while the example in which the X-ray phase imaging apparatus 100 includes the first and second rotation mechanisms 20 and 30 has been shown in the aforementioned embodiment, the present invention is not limited to this. Neither the first rotation mechanism 20 nor the second rotation mechanism 30 may be provided as long as the X-ray phase imaging apparatus 100 includes the subject holder 21 formed of the first material. However, if the X-ray phase imaging apparatus 100 does not include the first rotation mechanism 20, users are required to manually change the orientation of the subject 90 with respect to the gratings so that such a changing task become a burden on the users. On the other hand, if the X-ray phase imaging apparatus 100 does not include the second rotation mechanism 30, users are required to manually change the orientation of the subject 90 in the rotating direction about the second axis 52 when so-called CT imaging is performed so that such a changing task become a burden on the users. For these reasons, the X-ray phase imaging apparatus 100 preferably includes the first and second rotation mechanisms 20 and 30.

For example, while the example in which the first rotation mechanism 20 has a so-called belt-and-pulley mechanism has been shown in the aforementioned embodiment, the present invention is not limited to this. For example, the first rotation mechanism 20 may have a rack-and-pinion mechanism. Also, the first rotation mechanism 20 may have a ball screw mechanism. The first rotation mechanism 20 may have any mechanism as long as a member of the first rotation mechanism 20 that is arranged in the X-ray irradiation area is formed of the first material.

Also, while the example in which PEEK is used as the first material has been shown in the aforementioned embodiment, the present invention is not limited to this. For example, ABS, PET, Duracon, nylon, PE, PC, etc., may be used as the first material.

Also, while the example in which the driver 22 is spaced away from the subject holder 21 and arranged at a position outside the X-ray irradiation area has been shown in the aforementioned embodiment, the present invention is not limited to this. For example, the driver 22 may be arranged in the X-ray irradiation area if the driver 22 is formed of the first material.

Also, while the example in which the thickness 60 of the subject holder 21 along the first axis 51 is smaller than the thickness 61 of the support member 23 along the first axis 51 has been shown in the aforementioned embodiment, the present invention is not limited to this. For example, the thickness 60 of the subject holder 21 along the first axis 51 may be equal to or greater than the thickness 61 of the support member 23 along the first axis 51. However, if the thickness 60 of the subject holder 21 along the first axis 51 is equal to or greater than the thickness 61 of the support member 23 along the first axis 51, an attenuation of X-rays attenuated by the subject holder 21 will be increased as compared with the configuration according to the aforementioned embodiment. For this reason, it is preferable the thickness 60 of the subject holder 21 along the first axis 51 is smaller than the thickness 61 of the support member 23 along the first axis 51.

Also, while the example in which the subject holder 21 has a hollow structure has been shown in the aforementioned embodiment, the present invention is not limited to this. For example, the subject holder 21 may have no hollow structure. However, if the subject holder 21 has no hollow structure, an attenuation of X-rays attenuated by the subject holder 21 will be increased. For this reason, the subject holder 21 preferably has a hollow structure.

Also, while the example in which the second pulley 22b is formed of a metal material has been shown in the aforementioned embodiment, the present invention is not limited to this. For example, the second pulley 22b may be formed of the first material. However, if the second pulley 22b is formed of the first material, the electric motor 22a will be irradiated with X-rays passing through the second pulley 22b. Consequently, it is preferable that the second pulley 22b is formed of a metal material.

Also, while the example in which the first rotation mechanism 20 rotates the subject 90 to five angles of the initial angle to the fourth angle θ4 has been shown in the aforementioned embodiment, the present invention is not limited to this. For example, the number of angles to which the first rotation mechanism 20 rotate the subject 90 may be greater or smaller than five.

Also, while the example in which the second rotation mechanism 30 rotates the subject 90 to eight angles of the initial angle to the seventh angle θ11 has been shown in the aforementioned embodiment, the present invention is not limited to this. For example, the number of angles to which the second rotation mechanism 30 rotates the subject 90 may be greater or smaller than eight.

Also, while the example in which the first rotation mechanism 20 rotates the subject 90 180 degrees has been shown in the aforementioned embodiment, the present invention is not limited to this. For example, the first rotation mechanism 20 may rotate the subject 90 not smaller than 180 degrees, e.g., 360 degrees. On the other hand, the first rotation mechanism 20 may rotate the subject 90 in an angular range smaller than 180 degrees.

Also, while the example in which the second rotation mechanism 30 retains the first rotation mechanism 20 so that the second axis 52 becomes collinear with the vertical line 53 extending on a surface of the subject holder 21 and passing through the rotational center of the subject holder 21 has been shown in the aforementioned embodiment, the present invention is not limited to this. For example, the second rotation mechanism 30 may be configured to retain the first rotation mechanism 20 so that the second axis 52 becomes collinear with a vertical line extending on a surface of the subject 90 held on the subject holder 21 and passing through the rotational center of the subject holder 21.

Also, while the example in which the second rotation mechanism 30 removably holds the first rotation mechanism 20 has been shown in the aforementioned embodiment, the present invention is not limited to this. For example, the second rotation mechanism 30 may be configured to unremovably hold the first rotation mechanism 20. However, if the second rotation mechanism 30 is configured to unremovably hold the first rotation mechanism 20, when images of the subject 90 are captured while rotating the subject 90 only in the second rotating direction without rotating the subject 90 in the first rotating direction, the first rotation mechanism 20 will be an obstruction. For this reason, it is preferable that the second rotation mechanism 30 is configured to removably hold the first rotation mechanism 20.

Also, while the example in which the controller 70 is configured to capture images of the subject 90 at each of the angles (initial angle to seventh angle θ11) in the second rotating direction while intermittently rotating the subject 90 180 degrees in the first rotating direction by means of the first rotation mechanism 20 has been shown in the aforementioned embodiment, the present invention is not limited to this. For example, the controller 70 may be configured to capture images of the subject 90 at each of the angles (initial angle to fourth angle θ4) in the first rotating direction while intermittently rotating the subject 90 360 degrees in the second rotating direction by means of the second rotation mechanism 30.

Also, while the example in which the grating position adjustment mechanism 10 is configured to move the first grating 3 along the X, Y and Z directions, and the rotating directions Rz, Rx and Ry has been shown in the aforementioned embodiment, the present invention is not limited to this. In the present invention, the grating position adjustment mechanism 10 may be configured to move the first grating 3 along any one, or two or more of the X, Y and Z directions, and the rotating directions Rz, Rx and Ry. In addition, the grating position adjustment mechanism 10 may be configured to move the second or third gratings 4 or 5. If a fringe scan is made, the grating is necessarily configured to move in the direction corresponding to the fringe scan.

Also, while the example in which the plurality of gratings include the third grating 5 to increase coherence of X-rays radiated from the X-ray source 1 has been shown in the aforementioned embodiment, the present invention is not limited to this. The third grating 5 may not be provided if coherence of X-rays radiated from the X-ray source 1 is high.

Also, while the example in which a phase grating is provided as the first grating 3 to form a self-image by means of the Talbot effect has been shown in the aforementioned embodiment, the present invention is not limited to this. Since such a self-image simply requires a fringe pattern in the present invention, an absorption grating may be used instead of the phase grating. When the absorption grating is used, it will generate an area in which a fringe pattern is simply produced depending on optical conditions such as distance, and an area in which a self-image is produced by the Talbot effect.

MODES

The aforementioned exemplary embodiment will be understood as concrete examples of the following modes by those skilled in the art.

Mode Item 1

An X-ray phase imaging apparatus includes an X-ray source configured to irradiate a subject with X-rays; an X-ray detector configured to detect the X-rays radiated from the X-ray source; a plurality of gratings arranged between the X-ray source and the X-ray detector, and including a first grating to be irradiated with X-rays from the X-ray source and a second grating to be irradiated with the X-rays from the first grating; a subject holder arranged in an X-ray irradiation area and configured to hold the subject; and an image processor configured to generate an X-ray phase contrast image based on an intensity distribution of the X-rays detected by the X-ray detector, wherein the subject holder is formed of a first material having an X-ray transmittance greater than metal and an X-ray scattering degree smaller than the metal.

Mode Item 2

The X-ray phase imaging apparatus according to mode item 1 further includes a first rotation mechanism including the subject holder, and configured to rotate the subject holder in a first rotating direction about a first axis that becomes collinear with an X-ray irradiation axis when the first rotation mechanism faces the X-ray source and passes through a center of the subject holder.

Mode Item 3

In the X-ray phase imaging apparatus according to mode item 1, the subject holder is formed of a resin material as the first material having an X-ray transmittance greater than a fluorocarbon resin and an X-ray scattering degree smaller than the fluorocarbon resin.

Mode Item 4

In the X-ray phase imaging apparatus according to mode item 2, the first rotation mechanism is configured to be able to rotate the subject holder not smaller than 180 degrees in the first rotating direction.

Mode Item 5

In the X-ray phase imaging apparatus according to mode item 2, the first rotation mechanism further includes a driver configured to apply a driving force for rotating the subject holder, and a driving force transmission member configured to rotate the subject holder by means of the driving force applied from the driver; a member of the driving force transmission member that is arranged in the X-ray irradiation area is formed of the first material; and the driver is spaced away from the subject holder and arranged at a position outside the X-ray irradiation area.

Mode Item 6

In the X-ray phase imaging apparatus according to mode item 2, the first rotation mechanism is formed of the first material and includes a support member rotatably supporting the subject holder on one side of the support member; and a thickness of the subject holder along the first axis is smaller than a thickness of the support member along the first axis.

Mode Item 7

In the X-ray phase imaging apparatus according to mode item 5, the subject holder includes a subject stage having a plate-like shape and configured to hold the subject, and a first pulley having a cylindrical shape and engaging the driving force transmission member, and has a hollow structure formed by closing an opening on one side of the first pulley with the subject stage.

Mode Item 8

In the X-ray phase imaging apparatus according to mode item 7, the driving force transmission member includes a belt member engaging the first pulley; and the belt member is formed of a rubber material.

Mode Item 9

In the X-ray phase imaging apparatus according to mode item 8, the first pulley is formed of the first material; and the driver includes an electric motor configured to generate the driving force, and a second pulley formed of a metal material as a second material and coupled to the first pulley by the belt member.

Mode Item 10

The X-ray phase imaging apparatus according to mode item 6 further includes a second rotation mechanism holding the first rotation mechanism and configured to rotate the first rotation mechanism in a second rotating direction about a second axis extending orthogonal to the first axis, wherein the second rotation mechanism is configured to removably hold the first rotation mechanism; and the support member has an engagement portion configured to engage the second rotation mechanism so that the second axis becomes collinear with a vertical line extending on a surface of the subject holder and passing through a rotational center of the subject holder when the first rotation mechanism is held by the second rotation mechanism.

Mode Item 11

In the X-ray phase imaging apparatus according to mode item 2, the first rotation mechanism further includes a bearing formed of the first material and engaging an outer periphery of the subject holder.

Mode Item 12

In the X-ray phase imaging apparatus according to mode item 2, a through-hole for detecting an inclination of the first axis of the first rotation mechanism is formed at a rotational center of the subject holder so as to penetrate a holding surface of the subject holder along the first axis.

DESCRIPTION OF REFERENCE NUMERALS

1: X-ray source
2: X-ray detectors
3: first grating
4: second grating
5: third grating
6: subject rotation unit for X-ray phase imaging apparatus
7: moving mechanism
20: first rotation mechanism
21: subject holder
21a: subject stage
21b: first pulley
22: driver
22a: electric motor
22b: second pulley
23: support member
24: belt member
25: engagement portion
26: bearing
30: second rotation mechanism
40: X-ray phase contrast image
50: X-ray irradiation axis
51: first axis
52: second axis
60: thickness of subject holder along first axis
61: thickness of support member along the first axis
71: image processor
90: subject
100: X-ray imaging apparatus
121a: holding surface of subject holder

The invention claimed is:
1. An X-ray phase imaging apparatus comprising:
an X-ray source configured to irradiate a subject with X-rays;
an X-ray detector configured to detect the X-rays radiated from the X-ray source;
a plurality of gratings arranged between the X-ray source and the X-ray detector, and including a first grating to be irradiated with X-rays by the X-ray source and a second grating to be irradiated with the X-rays from the first grating;
a subject holder arranged in an X-ray irradiation area and configured to hold the subject;
an image processor configured to generate an X-ray phase contrast image including a dark-field image based on an intensity distribution of the X-rays detected by the X-ray detector; and
a first rotation mechanism including the subject holder, and configured to rotate the subject holder in a first rotating direction about a first axis that becomes collinear with an X-ray irradiation axis when the first rotation mechanism faces the X-ray source and passes through a center of the subject holder; wherein
the subject holder is formed of a first material having an X-ray transmittance greater than metal and an X-ray scattering degree smaller than the metal;
the first rotation mechanism is formed of the first material and includes a support member rotatably supporting the subject holder on one side of the support member; and
a thickness of the subject holder along the first axis is smaller than a thickness of the support member along the first axis.
2. The X-ray phase imaging apparatus according to claim 1, wherein the subject holder is formed of a resin material as the first material having an X-ray transmittance greater than a fluorocarbon resin and an X-ray scattering degree smaller than the fluorocarbon resin.
3. The X-ray phase imaging apparatus according to claim 1, wherein the first rotation mechanism is configured to be able to rotate the subject holder not smaller than 180 degrees in the first rotating direction.
4. The X-ray phase imaging apparatus according to claim 1, wherein
the first rotation mechanism further includes a driver configured to apply a driving force for rotating the subject holder, and a driving force transmission member configured to rotate the subject holder by means of the driving force applied from the driver;
a member of the driving force transmission member that is arranged in the X-ray irradiation area is formed of the first material; and the driver is spaced away from the subject holder and arranged at a position outside the X-ray irradiation area.

5. An X-ray phase imaging apparatus comprising:
an X-ray source configured to irradiate a subject with X-rays;
an X-ray detector configured to detect the X-rays radiated from the X-ray source;
a plurality of gratings arranged between the X-ray source and the X-ray detector, and including a first grating to be irradiated with X-rays by the X-ray source and a second grating to be irradiated with the X-rays from the first grating;
a subject holder arranged in an X-ray irradiation area and configured to hold the subject;
an image processor configured to generate an X-ray phase contrast image including a dark-field image based on an intensity distribution of the X-rays detected by the X-ray detector; and
a first rotation mechanism including the subject holder, and configured to rotate the subject holder in a first rotating direction about a first axis that becomes collinear with an X-ray irradiation axis when the first rotation mechanism faces the X-ray source and passes through a center of the subject holder; wherein
the subject holder is formed of a first material having an X-ray transmittance greater than metal and an X-ray scattering degree smaller than the metal,
the first rotation mechanism further includes a driver configured to apply a driving force for rotating the subject holder, and a driving force transmission member configured to rotate the subject holder by means of the driving force applied from the driver;
a member of the driving force transmission member that is arranged in the X-ray irradiation area is formed of the first material;
the driver is spaced away from the subject holder and arranged at a position outside the X-ray irradiation area; and
the subject holder includes a subject stage having a plate-like shape and configured to hold the subject, and a first pulley having a cylindrical shape and engaging the driving force transmission member, and has a hollow structure formed by closing an opening on one side of the first pulley with the subject stage.

6. The X-ray phase imaging apparatus according to claim 5, wherein
the driving force transmission member includes a belt member engaging the first pulley; and
the belt member is formed of a rubber material.

7. The X-ray phase imaging apparatus according to claim 6, wherein
the first pulley is formed of the first material; and
the driver includes an electric motor configured to generate the driving force, and a second pulley formed of a metal material as a second material and coupled to the first pulley by the belt member.

8. The X-ray phase imaging apparatus according to claim 1, further comprising a second rotation mechanism holding the first rotation mechanism and configured to rotate the first rotation mechanism in a second rotating direction about a second axis extending orthogonal to the first axis, wherein the second rotation mechanism is configured to removably hold the first rotation mechanism; and
the support member has an engagement portion configured to engage the second rotation mechanism so that the second axis becomes collinear with a vertical line extending on a surface of the subject holder and passing through a rotational center of the subject holder when the first rotation mechanism is held by the second rotation mechanism.

9. The X-ray phase imaging apparatus according to claim 1, wherein the first rotation mechanism further includes a bearing formed of the first material and engaging an outer periphery of the subject holder.

10. An X-ray phase imaging apparatus comprising:
an X-ray source configured to irradiate a subject with X-rays;
an X-ray detector configured to detect the X-rays radiated from the X-ray source;
a plurality of gratings arranged between the X-ray source and the X-ray detector, and including a first grating to be irradiated with X-rays by the X-ray source and a second grating to be irradiated with the X-rays from the first grating;
a subject holder arranged in an X-ray irradiation area and configured to hold the subject;
an image processor configured to generate an X-ray phase contrast image including a dark-field image based on an intensity distribution of the X-rays detected by the X-ray detector; and
a first rotation mechanism including the subject holder, and configured to rotate the subject holder in a first rotating direction about a first axis that becomes collinear with an X-ray irradiation axis when the first rotation mechanism faces the X-ray source and passes through a center of the subject holder; wherein
the subject holder is formed of a first material having an X-ray transmittance greater than metal and an X-ray scattering degree smaller than the metal;
the first rotation mechanism further includes a driver configured to apply a driving force for rotating the subject holder, and a driving force transmission member configured to rotate the subject holder by means of the driving force applied from the driver;
a member of the driving force transmission member that is arranged in the X-ray irradiation area is formed of the first material;
the driver is spaced away from the subject holder and arranged at a position outside the X-ray irradiation area; and
a through-hole for detecting an inclination of the first axis of the first rotation mechanism is formed at a rotational center of the subject holder so as to penetrate a holding surface of the subject holder along the first axis.

11. The X-ray phase imaging apparatus according to claim 1, wherein the resin material includes any of PEEK (Poly Ether Ether Ketone), ABS (Acrylonitrile Butadiene Styrene), PET (Polyethylene terephthalate), acrylic, Duracon, nylon, PE (Polyethylene) and PC (Polycarbonate).

* * * * *